June 14, 1960  R. D. HENDERSON  2,940,514
TIRE DEMOUNTING TOOL
Filed Dec. 6, 1956  2 Sheets-Sheet 2
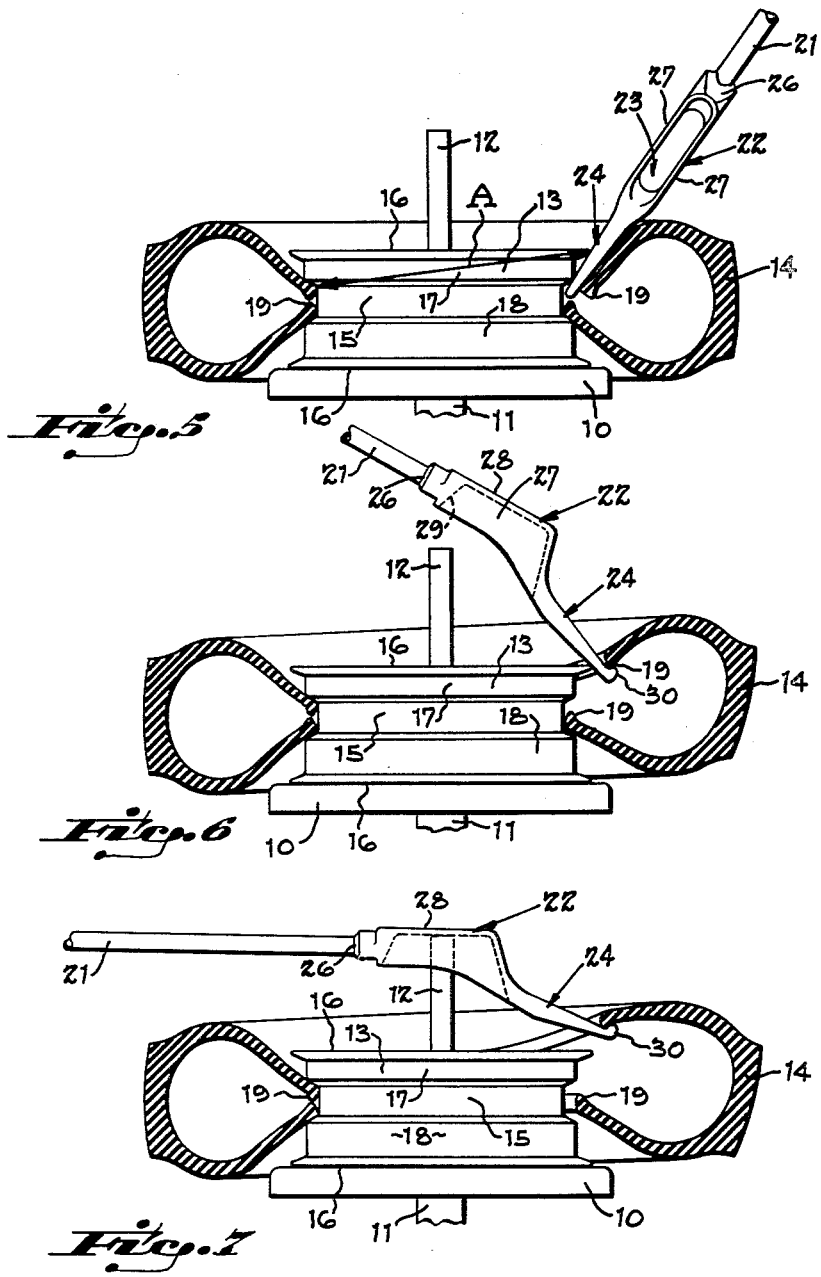
INVENTOR.
Robert D. Henderson
BY
Wood, Herron & Evans
ATTORNEYS.

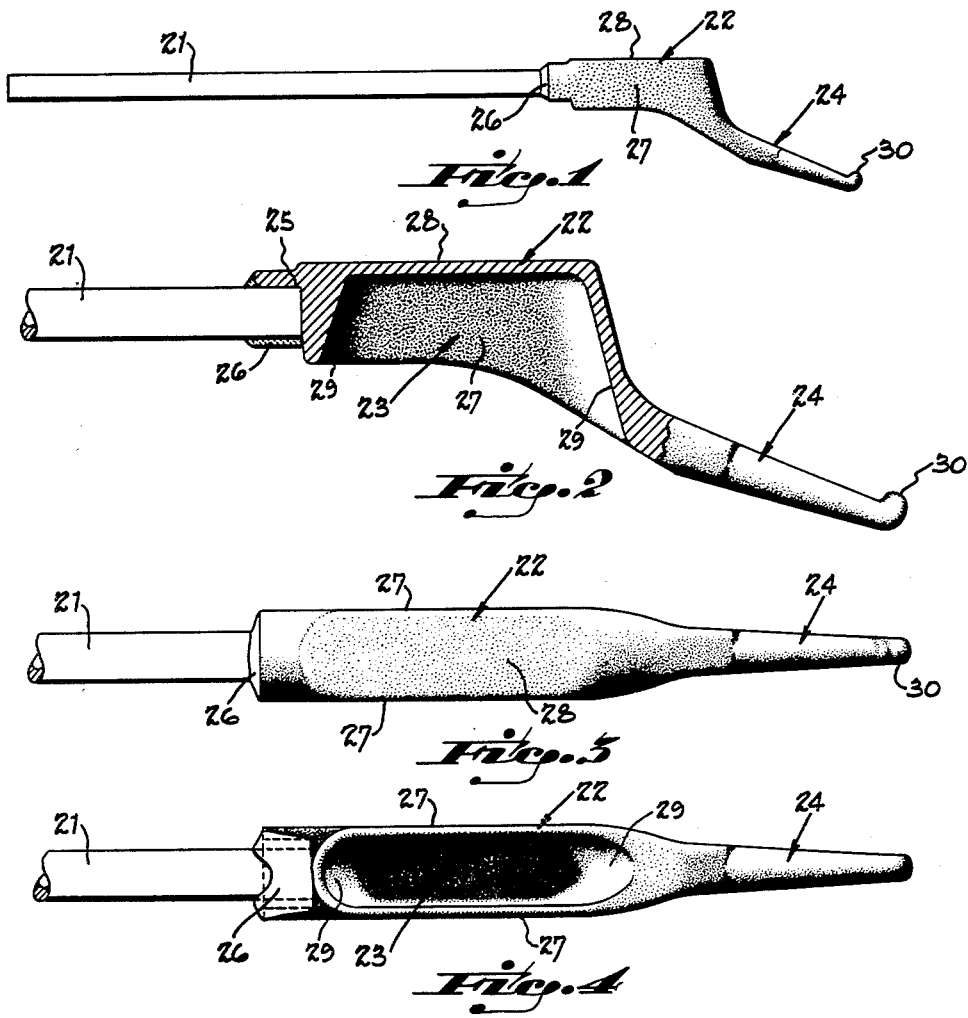

United States Patent Office 2,940,514
Patented June 14, 1960

2,940,514

TIRE DEMOUNTING TOOL

Robert D. Henderson, 7413 Willow Brook,
Cincinnati, Ohio

Filed Dec. 6, 1956, Ser. No. 626,739

1 Claim. (Cl. 157—1.22)

This invention relates to the demounting of pneumatic tires from vehicle wheels and it is directed in particular to a tool which is adapted to be used to demount tires from wheels of the type having a drop center rim.

A demounting tool is employed after the beads of a tire have been "broken" from their seats on the rims of a wheel, and its function is to complete the removal of the tire from the wheel. In order to do this, the beads of the tire first must be forced into the drop center well and then bottomed in the well at one side of the wheel. This displaces the tire toward one side of the wheel and provides a space between the wheel rim and the tire into which the demounting tool may be inserted. The tool is engaged underneath a bead of the tire and this bead is then lifted or pried over the rim. After this, the second bead may be lifted over the rim in a like manner. The demounting tool of this invention is for use primarily on wheels having shallow drop center wells.

Although it is not designed for use on wheels of this type, reference is made to the tool of U.S. Patent No. 2,712,350 in order to explain the demounting problems created by shallow drop center wheels. In the patent to which reference is made, I have disclosed a tire demounting tool which is adapted to be used in conjunction with a stand to which a wheel with a tire in place upon it is clamped in a horizontal position. The stand includes a post which projects up through the center of the wheel to a point above it. The post provides a fulcrum for the tool in the lifting of the tire beads over the wheel rim, and it also provides a center about which the tool may be rotated to work the tool completely around the tire. (A stand of this type is employed with the present tool.)

The tool of the patent consists of two thin blades which diverge from one another and which are configurated to approximate the curvature of the wheel rim when the tool is engaged upon the center post. In order that there be enough space for these two diverging blades to fit between the bead and a rim, the drop center well must be a substantially deep one. The available space is, of course, directly dependent upon the depth of the well. In the fifteen inch and larger vehicle wheels used extensively by automobile manufacturers in the past, the space provided by well depth has been more than adequate to accommodate the blades of the patented demounting tool.

Now, the manufacturers of several of the popular makes of automobiles have changed from a fifteen inch diameter wheel to a fourteen inch diameter wheel, but in so doing they have not changed the diameter of the well itself, with the result that the difference between the diameter of the rim and the diameter of the well (which is the effective well depth) has been reduced considerably. Hence, the space provided at one side of the wheel for the insertion of a tire demounting tool has been reduced accordingly and the diverging blades of the patented tool, even though they are thin, cannot be employed without damaging the tire.

There is a second factor in the space available for the insertion of a demounting tool and it is the width of the ledges on the wheel. These ledges extend from the sides of the well to the wheel rims. At the time a bead is being lifted over a rim, the tire is canted with respect to the wheel, and the amount of the cant or angulation of the tire on the wheel is directly related to the width of the ledge adjacent to the rim over which the bead is being lifted. The trend in automobile tire design is toward spacing the beads apart, in the inflated tire, a distance substantially greater than the width of the tread. (The purpose is to give lateral stability to the tire when the automobile is "cornering.") In order to gain this spread between the beads, the ledges have been widened, and will probably be wider in the future, which adds to the problem of demounting, because the degree of cant is increased.

The shallow well and the wider ledges cause an extremely tight fit between the tire and the wheel when the beads are being lifted over the rim. To further complicate the problem of demounting tires from such wheels, the tires used on these wheels are in almost every instance tubeless, which means that extra care must be exercised when the beads are drawn over the rims, otherwise the sealing surfaces of the beads are scored and thereby ruined.

The primary objective of this invention, therefore, is to provide a tire demounting tool which is effective to remove tight fitting tires without injury to the beads, and a preferred embodiment of the tool is disclosed in the drawings in which:

Figure 1 is a side elevational view of a tire demounting tool incorporating the principles of the invention.

Figure 2 is a fragmentary view of the operating end of the tool, shown partly in section, to illustrate details of construction.

Figure 3 is a top plan view of the tool.

Figure 4 is a plan view of the underside of the tool.

Figure 5 is a diagrammatic view showing a tire in cross section mounted upon a wheel with the tool of the invention being inserted between the upper bead and the rim of the wheel.

Figure 6 is a view similar to Figure 5 showing the tool engaged under the upper bead in a first fulcruming position in which the bead is being lifted above the rim.

Figure 7 is a view similar to Figure 5 showing the tool in a second fulcruming position in which the bead is being lifted free of the wheel.

Reference is made to Figures 5–7 of the drawings. In these figures the numeral 10 designates a circular table of a stand similar to the type disclosed in Patent 2,712,305. This table is mounted on top of a pedestal 11 having a base (not shown) which is bolted to the floor. A center post 12 extends upwardly from the center of the table and provision is made for locking a wheel 13 onto the table, the locking means being associated with the lower part of the center post. Also in these figures an automobile tire is designated by the numeral 14. The wheel shown is of a type having a drop center well 15, the usual rims 16—16 and two ledges which are designated 17 and 18 respectively.

In Figure 5 the tire is shown after the beads 19—19 have been broken from the rims and forced into the drop center well 15. It is to be noted that the well 15 is off center with respect to the two rims so that ledge 17 is substantially narrower than ledge 18. This particular wheel construction is one employed by two of the major manufacturers of automobiles. It is to be understood however, that this particular wheel design is shown for illustration purposes only and that the tool of this invention is adapted to be used on other types of wheels. In the instance shown, the wider ledge 18 is toward the outer side of the wheel and the wheel is placed upon table 10 with the outer side down so that the narrower ledge is up. It is exceedingly important in a wheel design of this type that the tire beads be removed from the side having the narrower ledge, because the dimension across the line designated A in Figure 5 is just large enough to permit the beads to be lifted over the wheel rim. The counterpart of this dimension at the opposite side of the wheel, due to the wider ledge 18, does not permit the beads to be removed from this side of the wheel without seriously damaging the bead seals of tubeless tires.

Furthermore, the wheel shown has an outside diameter of 14 inches, this being 1 inch less than automobile wheels employed for past models. The wheel differs from previous ones in that the outside diameter of the rim has been decreased by an inch, but the diameter of the drop center well has not been decreased. (One reason for this is that a decrease in the diameter of the well would necessitate a decrease in the diameter of the brake drum—with a corresponding decrease in braking area.) The well thus is on half inch shallower than previous wells and this decrease has made an exceedingly tight fit for the beads when the tire is mounted on or demounted from the wheel.

The tool of this invention comprises an elongated handle 21 which preferably is tubular and a working head designated generally by the numeral 22. In the instance shown, the head is fabricated as a casting and it comprises in general a socket portion 23 and a projection 24 which extends from the socket portion at the end opposite to the handle. Preferably the handle is engaged in a seat 25 formed in the head and it is welded as at 26 therein to become an integral part of it. The socket portion of the head has substantially flat sides 27—27 and a substantially flat upper surface 28. The underside of the socket portion is open and the ends 29 are both rounded and tapered inwardly as shown in Figures 2 and 4 to assist in the engagement of the socket over the top of center post 12 for reasons to be explained below.

The following dimensions for the demounting tool are given by way of example and are not intended to be limiting inasmuch as it will be apparent to those skilled in the art that not all of the dimensions are critical to the successful operation of the tool. The projection 24 is approximately 6 inches long and it tapers, being substantially circular in cross section as shown, from a maximum diameter of slightly over 1 inch adjacent to the socket portion to a minimum diameter of slightly over ½ inch adjacent to the outer end. The outer end of the projection is turned up to provide a rounded bead engaging protuberance or button 30 which is approximately ¾ of an inch in height overall, but which is no wider than the minimum diameter of the outer end of the projection. The projection is angulated downwardly from the forward end of the socket portion so that its central axis is disposed at approximately 20 degrees relative to the central axis of the tubular handle 21. The overall distance from the forward end of the tool, i.e., the bead engaging end, to the rear end of the socket is approximately 12 inches. The width of the socket is dependent upon the diameter of the center post over which it is engaged and in the instance shown is approximately 1⅜ inches. The socket, in addition may be approximately 5 inches long at its inner end. In the operation of the tool, no more than 1½ inches of the outer end of the tool engages the tire.

Reference again is made to Figures 5–7 which show the demounting tool in three stages of a demounting operation. In Figure 5 the tool is shown inserted into the space between the tire and the rim at one side of the wheel. To do this, the tool is turned so that the protuberance or button 30 is to the side so as to not add its height to the overall dimension of the working end of the tool. Once the tool is inserted to the depth shown in Figure 5, it may be turned so that the button 30 hooks under the bead. Thus turned, the socket is positioned to be engaged over the center post as shown in Figure 6. This position of the tool constitutes a first fulcrum position in which the underside of the working end of the tool rests against the rim of the wheel, the protuberance 30 is engaged or hooked underneath the bead, and the operating handle extends across the wheel such that the operator by pulling down on the handle can exert lifting force on the bead to pry it above the rim.

In the position of the tool shown in Figure 7, the socket is engaged on top of the center post in a second fulcrum position in which the moment arms are from the center post to the outer end of the projection in one direction and to the end of the handle in the opposite direction. In the second fulcrum position the operator, by depressing the outer end of the handle, can lift the bead free of the rim and then from this position, by walking around the stand, he can progressively free the bead. In the demounting operation, the first fulcrum position gives the operator a tremendous amount of leverage so that he can overcome the resistance of the extremely tight fit between the tire and the wheel. In the second fulcrum position the operator has more than enough leverage from the center post to the outer end of the handle to complete the demounting operation.

It is exceedingly important in the demounting of a tubeless tire to protect the sealing surfaces on the bead. The tool of this invention not only provides a highly effective instrument which can be inserted into the small space available in the removal of a tire from a shallow drop center rim wheel, but it also provides the leverage necessary to overcome the very tight fit between the tire and wheel, and it provides a means of demounting a tire without injury to the delicate sealing surfaces of tubeless tires. The bead engaging protuberance insures that the major portion of the lifting force is placed on the inside of the bead and that this force is directed away from the rim at the critical time the bead is being lifted over the rim. It further insures that there is no harsh scraping contact between the working end of the tool and the sealing surfaces of the bead.

The present tool construction has its greatest utility in the demounting of tight fitting tires of the type described, that is, the shallow drop center well, fourteen inch diameter wheels. Its utility is not limited to these particular wheels, however, because it can be used on both smaller and larger wheels, and it is found to operate upon wheels of the type for which the tool of Patent No. 2,712,350 was designed with equal facility.

Having described my invention I claim:

A tire demounting tool for use in conjunction with a stand having means to clamp a wheel with a tire thereon in fixed relation, said stand having a post disposed to extend through the center of a wheel clamped thereon to a point at one side of said wheel, said tool comprising an elongated handle, a head affixed to said handle, said head including a socket engageable over the top of said center post, said socket being elongated in the direction of the longitudinal axis of the handle, a projection extending from the end of said head opposite to the handle, said projection being angulated downwardly at approximately 20 degrees to the center axis of the handle and tapering from said head to an outer end approximately ½ inch in diameter, a bead engaging button extending upwardly from the outer end of the tool, said bead engaging button being rounded and at least as narrow as the outer end of said projection and extending upwardly therefrom less than ½ inch, the surface of said projection opposite said button being smooth and comprising a uniform continuation of the adjacent surface of said projection, whereby the projection may be inserted into the space between the rim of a wheel and the bead of a tire on the wheel with the tool turned sidewise so that the bead engaging button does not interfere with said insertion and the tool then turned through 90 degrees to present the button to the inner side of the bead.

References Cited in the file of this patent

UNITED STATES PATENTS

| | | |
|---|---|---|
| 934,461 | Phillips | Sept. 21, 1909 |
| 1,157,763 | Cunningham | Oct. 26, 1915 |
| 1,220,659 | Mansbach | Mar. 27, 1917 |
| 2,712,350 | Henderson | July 5, 1955 |